United States Patent
Chiavetti et al.

(10) Patent No.: US 12,486,988 B2
(45) Date of Patent: Dec. 2, 2025

(54) METHOD FOR THE PREDICTIVE MAINTENANCE OF PRIMARY CIRCUIT COMPONENTS OF A BOILER

(71) Applicant: ARISTON S.P.A., Fabriano (IT)

(72) Inventors: Flavio Chiavetti, Fabriano (IT); Lorenzo Centurelli, Osimo (IT); Giacomo Silvestri, Otricoli (IT)

( * ) Notice: Subject to any disclaimer, the term of this patent is extended or adjusted under 35 U.S.C. 154(b) by 187 days.

(21) Appl. No.: 18/260,641

(22) PCT Filed: Dec. 23, 2021

(86) PCT No.: PCT/IB2021/062256
§ 371 (c)(1),
(2) Date: Jul. 7, 2023

(87) PCT Pub. No.: WO2022/153117
PCT Pub. Date: Jul. 21, 2022

(65) Prior Publication Data
US 2024/0060655 A1   Feb. 22, 2024

(30) Foreign Application Priority Data
Jan. 12, 2021  (IT) .................. 102021000000383

(51) Int. Cl.
*F24D 19/10*  (2006.01)

(52) U.S. Cl.
CPC ..... *F24D 19/1066* (2013.01); *F24D 19/1024* (2013.01); *F24D 2220/044* (2013.01)

(58) Field of Classification Search
None
See application file for complete search history.

(56) References Cited

U.S. PATENT DOCUMENTS

| | | | |
|---|---|---|---|
| 4,370,949 A * | 2/1983 | Beckett | F22B 33/00 165/909 |
| 4,709,854 A * | 12/1987 | Biagini | F24H 15/174 237/19 |

(Continued)

FOREIGN PATENT DOCUMENTS

| | | |
|---|---|---|
| EP | 2966367 A1 | 1/2016 |
| GB | 2406901 A | 4/2005 |
| JP | 2004116942 A | 4/2004 |

OTHER PUBLICATIONS

International Search Report for corresponding PCT/IB2021/062256 dated Mar. 18, 2022.

(Continued)

*Primary Examiner* — Edelmira Bosques
*Assistant Examiner* — Deepak A Deean
(74) *Attorney, Agent, or Firm* — Egbert, McDaniel & Swartz, PLLC

(57) ABSTRACT

Disclosed a control method for monitoring the efficiency status of the components of the primary circuit of a gas boiler, the components including the pump, the primary exchanger, and the secondary exchanger on the primary side. The method includes a first part "method M.dhw" suitable to signal that one of the components of the primary circuit is degraded, due to a drop in the flow rate Q circulating in the primary circuit. Said method further envisages a second part "method M.hea" (or, alternatively, "method M.hea.bis"), capable of indicating that the component of the primary circuit actually responsible for the degradation is either the secondary exchanger on the primary side or one of the pump and the primary exchanger.

34 Claims, 6 Drawing Sheets

(56) References Cited

U.S. PATENT DOCUMENTS

| | | | |
|---|---|---|---|
| 4,718,478 A * | 1/1988 | Huber | G05D 23/1931 |
| | | | 236/94 |
| 6,904,874 B1 * | 6/2005 | Pouchak | F24H 15/335 |
| | | | 122/447 |
| 11,603,996 B2 * | 3/2023 | Gagne | F24H 15/215 |
| 2010/0195991 A1 | 8/2010 | Deivasigamani et al. | |
| 2014/0209042 A1 * | 7/2014 | Hardesty | F24H 15/254 |
| | | | 122/18.5 |
| 2018/0073748 A1 * | 3/2018 | Gagne | F23N 1/102 |
| 2018/0073749 A1 * | 3/2018 | Gagne | F24H 15/215 |
| 2018/0120824 A1 | 5/2018 | Shimada | |
| 2020/0200401 A1 * | 6/2020 | Gagne | F24H 15/174 |
| 2021/0123610 A1 * | 4/2021 | Gagne | F24H 15/36 |
| 2022/0373195 A1 * | 11/2022 | Cunningham | F24H 1/52 |
| 2022/0373226 A1 * | 11/2022 | Cunningham | F24D 19/1066 |
| 2022/0373227 A1 * | 11/2022 | Cunningham | F24H 1/10 |
| 2025/0075920 A1 * | 3/2025 | Vorsteveld | F24H 15/281 |

OTHER PUBLICATIONS

Written Opinion of the International Searching Authority for corresponding PCT/IB2021/062256 dated Mar. 18, 2022.

* cited by examiner

MODE HEA

Method M.dhw

METHOD FOR THE PREDICTIVE MAINTENANCE OF PRIMARY CIRCUIT COMPONENTS OF A BOILER

The object of the present invention is a control method for monitoring the efficiency of the components of the primary circuit of a gas boiler and for emitting a warning signal in case of a variation of the efficiency beyond a certain limit value, representative of the fact that such components need maintenance.

In particular, the invention is included in the sector of gas boilers, especially condensing boilers, suitable for the production of hot water for room heating and sanitary purposes.

As is well known, a gas boiler comprises a heating water circuit (primary circuit) and a domestic water circuit (DHW circuit). Each of the two circuits has its own heat exchanger, the "primary exchanger" and the "secondary exchanger" respectively.

In the primary heat exchanger, the heat from the flame of a burner is transferred to the heating water (henceforth "heat transfer fluid"); in the secondary heat exchanger, the heat is instead transferred from the hot heat transfer fluid circulating in the primary circuit to the cold domestic water circulating in the domestic circuit.

It is also well known that the high temperature to which the heat transfer fluid is brought is the cause of the formation of limescale and clogging of the components of the primary circuit, caused by the precipitation of salts (mainly calcium sulphates) and impurities in colloidal form (typically iron oxides, bacteria, algae, sludge), which are deposited on the internal surface of the pipes and heat exchangers.

Over time, these formations cause undesirable increases in surface frictional resistance to the flow of water in the ducts, to the point of risking obstructing their passage, while in the heat exchangers they also reduce heat transmission, reducing efficiency and jeopardising the operation of the entire unit.

It is, therefore, necessary to periodically check the functionality of these components and to maintain them before they break down or cause irreparable damage to the boiler.

Prior art documents EP2966367 and JP2004116942, respectively concerning systems using a heat pump and a heat pump water heater, describe methods for detecting a possible anomaly due to clogging and limescale deposits, based on the control of the flow rate of the liquid circulating in the heat exchanger where the refrigerant flows and transfers heat to the water intended for the user.

However, in both these patents, we are in the presence of a single component that is susceptible to degradation over time, represented by the heat exchanger with which the heat pumps described are equipped; in heating systems based on the use of a gas boiler, on the other hand, it is necessary to control a greater number of components of the primary circuit, all potentially subject to loss of efficiency over time.

The present invention aims to overcome this kind of inconvenience, providing a method and relative control means to monitor the efficiency status of the components of the primary circuit of the boiler, in particular the primary and secondary heat exchangers and the circulation pump.

Another purpose of the present invention, at least in some of its variants, is to indicate a method operating effectively with the components and means already present in a typical gas boiler, without the need to resort to additional devices or incurring additional costs.

A further purpose of the present invention, at least for some of its variants, is to indicate ways of signalling the need to carry out maintenance on the components of the boiler being monitored, by means of warning systems that provide improved user-friendliness.

These and other purposes, which will become clear later, are achieved by a control method for monitoring the condition of the primary circuit components of a gas boiler, in accordance with the dictate of the independent claims. Other purposes can also be achieved by the additional features of the dependent claims. Further features of the present invention will be better evidenced by the following description of a preferred embodiment in accordance with the patent claims and illustrated, by way of a non-limiting example only, in the attached drawings, wherein:

Figure 4:
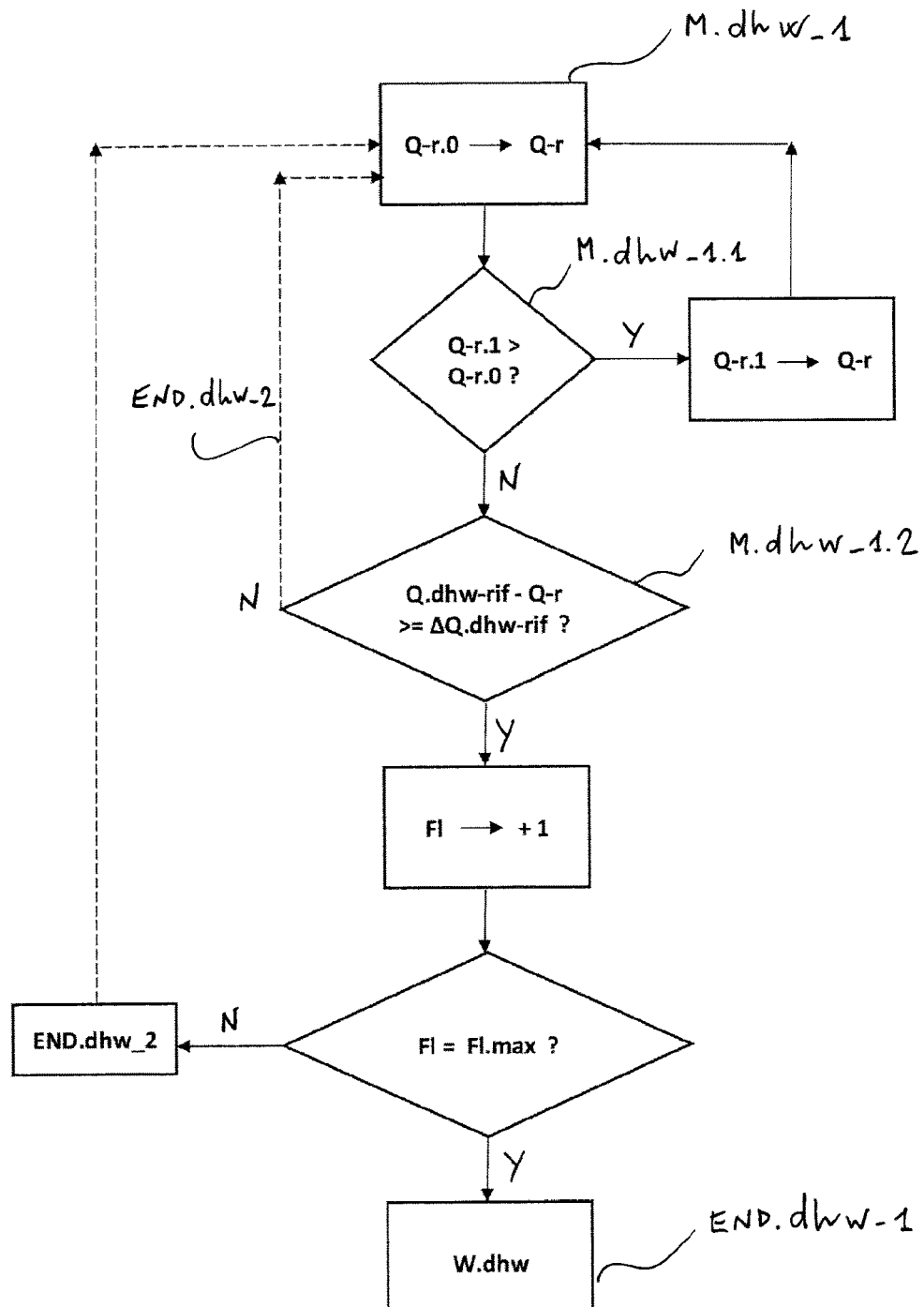
Figure 5:
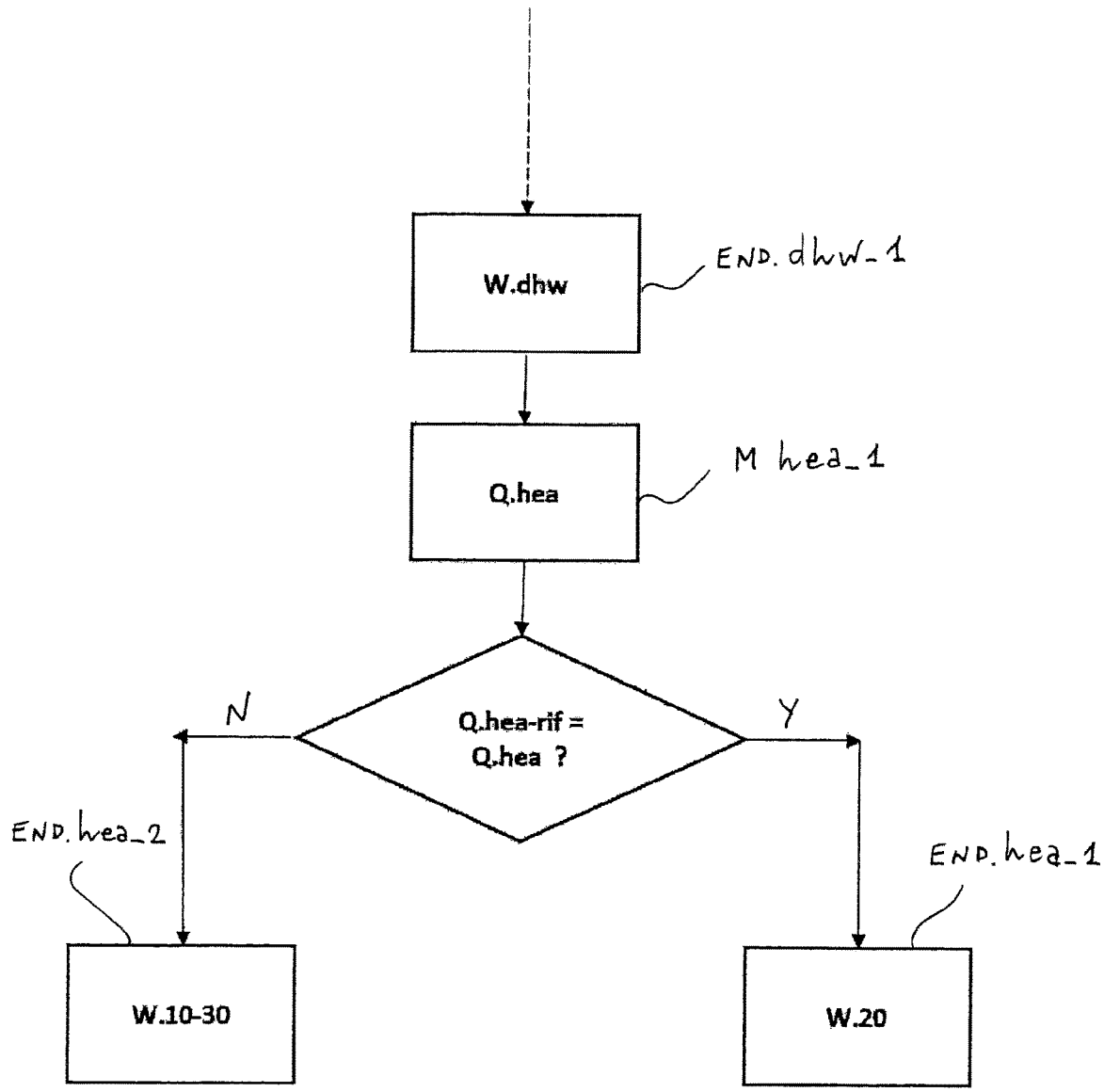
Figure 6:
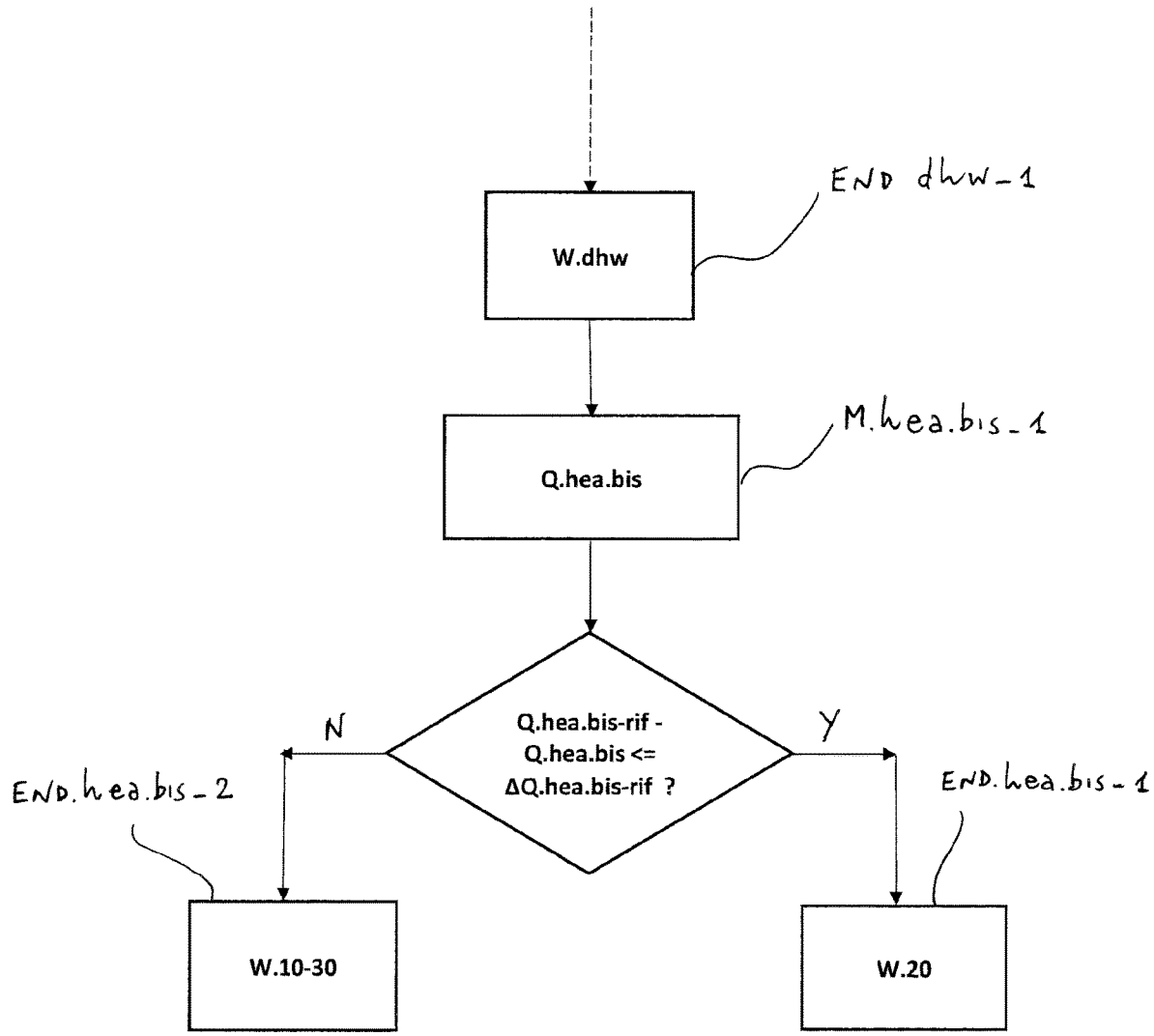

FIG. 4 schematically depicts a block diagram summarising a first step of the control method according to the invention;

FIG. 5 schematically illustrates a block diagram summarising a second step of the control method according to the invention, in accordance with a first variant;

FIG. 6 schematically illustrates a block diagram summarising a second step of the control method according to the invention, in accordance with a second variant.

The characteristics of a preferred variant of the control method according to the invention and of the relative boiler implementing the said method are now described, making use of the references contained in the figures. It should be noted that the aforesaid figures, although schematic, reproduce the elements of the invention according to proportions between their dimensions and spatial orientations which are compatible with a possible embodiment.

Figure 1:
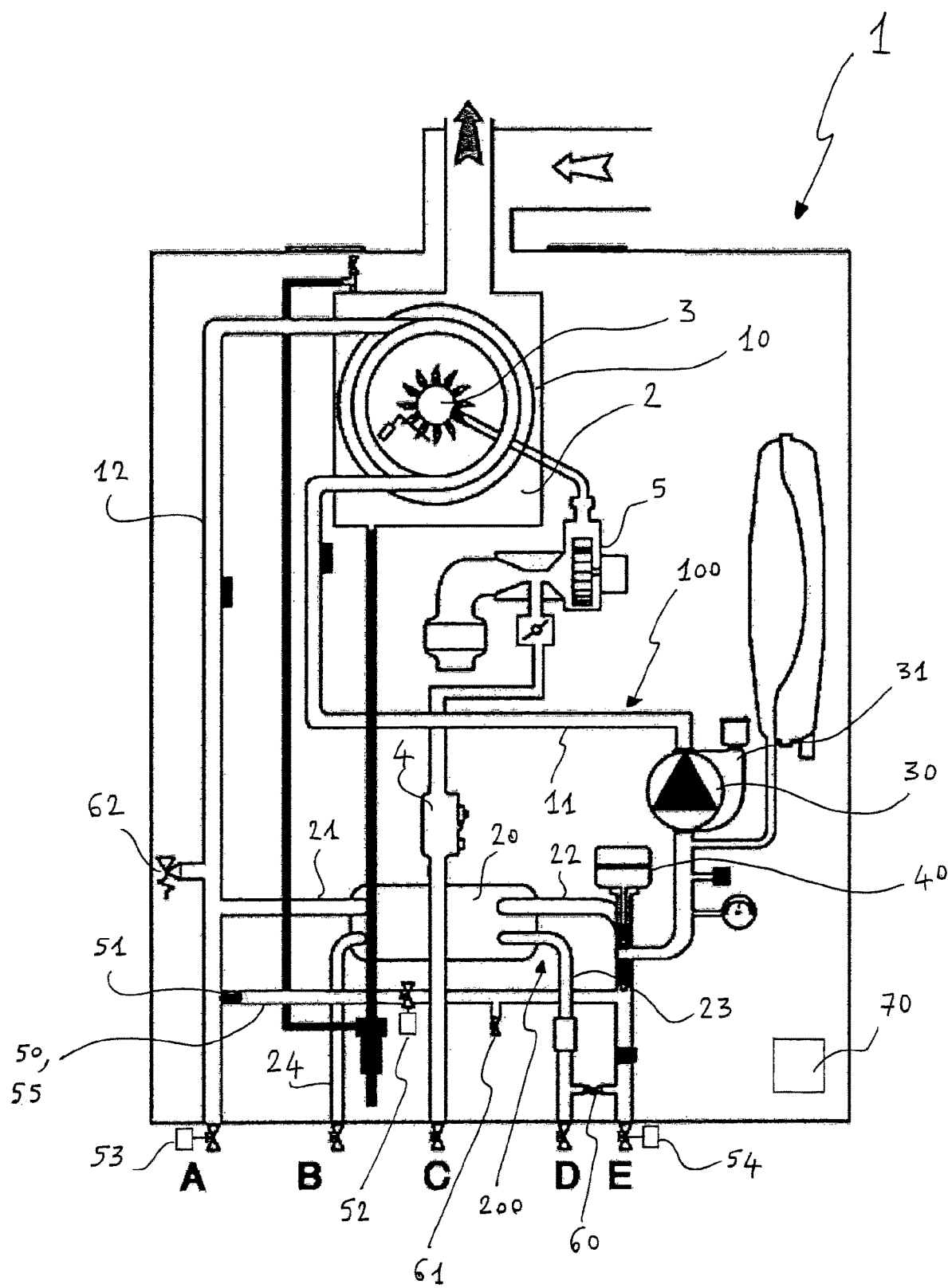
FIG. 1 shows the hydraulic diagram of a typical gas boiler, in which the control method according to the invention is implementable.

With reference to FIG. 1, 1 indicates a gas boiler, in particular a gas condensing boiler, inside which are located the components necessary for its operation, which are well known to the technician of the sector; only those components strictly relevant to the object of the invention will be mentioned herein.

Boiler 1 comprises a primary circuit 100 and a secondary circuit 200, both intended to heat water through a corresponding heat exchanger, namely a primary heat exchanger 10 (hereinafter "primary heat exchanger 10") for the heat transfer fluid and a secondary heat exchanger 20 (hereinafter "secondary heat exchanger 20") for the domestic water.

Reference 4 indicates the gas valve, which modulates the influx of gas through the gas inlet C to direct it to feed the burner 3 (located in the combustion chamber 2 housing the primary exchanger 10), after mixing with the combustion air modulated by the fan 5.

This primary circuit 100 comprises:
- a return duct 11 which, via the inlet E, conducts the heat transfer fluid coming from the heating bodies of the system (not shown) towards the primary exchanger 10, where this fluid is subjected to the hot combustion fumes produced by the said burner 3;
- the aforesaid primary exchanger 10 which, in the example of the preferred variant shown, is constituted by a helical coil exchanger;
- a circulation pump 30 (hereinafter referred to as "pump 30"), placed on said return conduit 11; preferably, as shown in the figures, said pump 30 also comprises a deaeration device 31 for disposing of air bubbles formed in the heat transfer fluid;

a supply conduit 12 of the heat transfer fluid, which starts from said primary exchanger 10 to be sent to the heating bodies of the heating system (hereinafter referred to as "system") via outlet A, a by-pass circuit 50 (hereinafter referred to as "by-pass 50"), according to prior art, provided with a calibrated spring check valve 51; known purpose of by-pass 50 is to open when the flow rate of the heat transfer fluid circulating in said primary circuit 100 decreases below certain values, due to pressure drops in the heating system, in order to replenish its flow rate;

filling cock 60, drain cock 61, safety valve 62, all preferably according to prior art.

Figure 3:
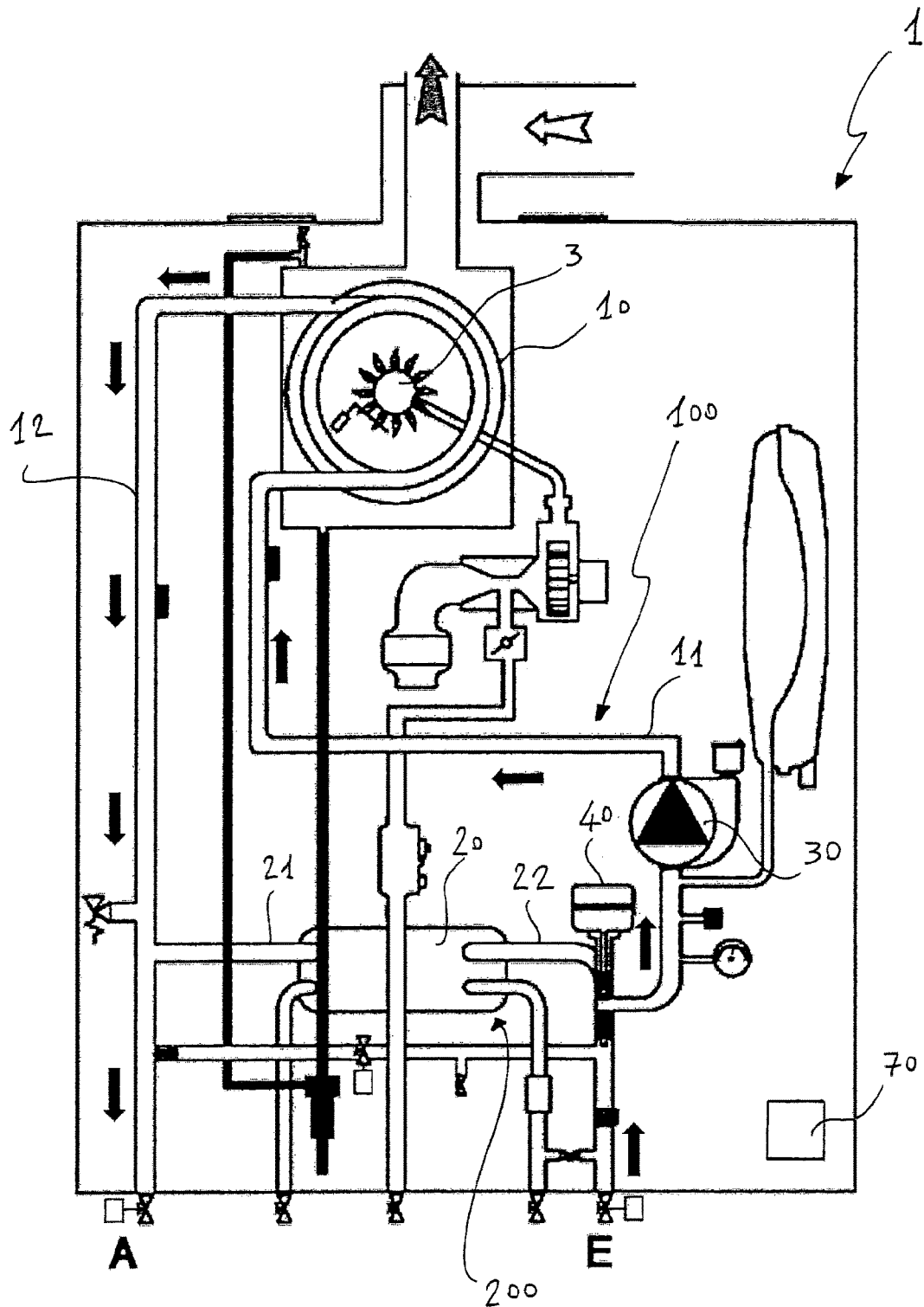
FIG. 3 shows the hydraulic diagram of the boiler of FIG. 1, operating in accordance with a second "HEA heating" operating mode, in accordance with the control method of the invention.

The path of the heat transfer fluid just described is more clearly indicated with arrows in FIG. 3 and shows the operation of boiler 1 in the "HEA room heating" operating mode (from now on "HEA mode").

Figure 2:
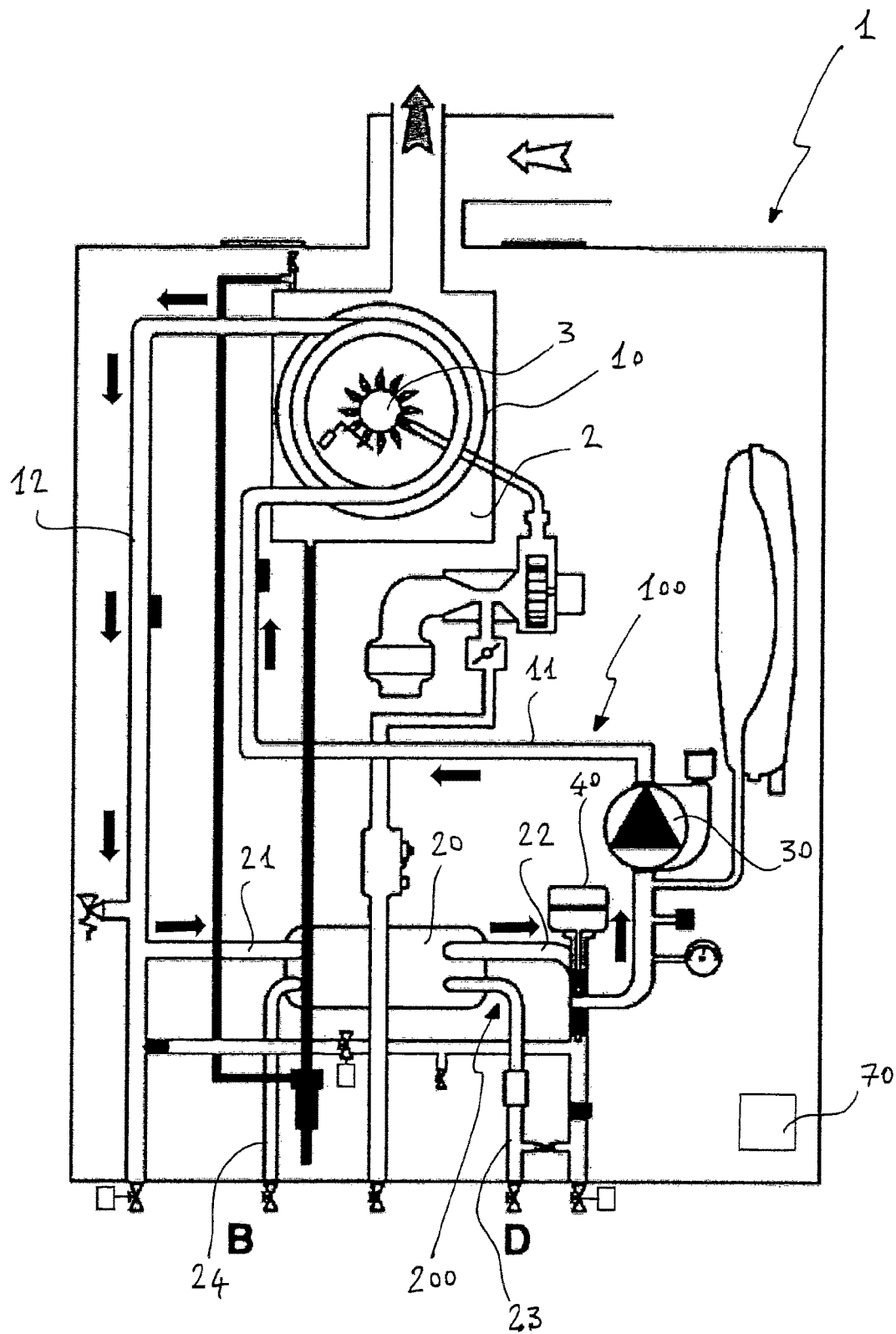
FIG. 2 shows the hydraulic diagram of the boiler of FIG. 1, operating according to a first "DHW sanitary" mode in accordance with the control method of the invention.

Said primary circuit 100 also includes an inlet conduit 21, derived from the supply conduit 12, and suitable to make the heat transfer fluid flow towards the secondary exchanger 20, from which it then exits by means of a return conduit 22 to make said fluid return to the return conduit 11 of said primary circuit 100. When the heat transfer fluid, instead of following the path of the HEA operating mode of FIG. 3, is diverted to cross the secondary exchanger 20 through the aforesaid inlet ducts 21 and return duct 22, the boiler operates in "DHW domestic water heating" operating mode (hereinafter "DHW mode"), as indicated by arrows in FIG. 2.

The secondary circuit 200 comprises:

a supply conduit 23 of cold water entering the secondary exchanger 20 through inlet D, this cold water being heated by the aforementioned inlet conduits 21 and return conduit 22 of the primary circuit 100 to produce hot domestic water to be sent to the user through outlet B with a supply conduit 24;

the aforementioned secondary exchanger 20, generally of the plate type.

Reference 40 indicates a motorised three-way diverter valve (henceforth abbreviated to "three-way 40"), the switching of which determines the operation of boiler 1 in DHW or HEA mode.

In such DHW mode:

pump 30 is typically maintained at maximum speed, the three-way 40 diverts the flow of the primary circuit 100 towards the secondary exchanger 20.

In HEA mode:

the speed of rotation of pump 30 is variable as required, the three-way 40 diverts the flow of the primary circuit 100 towards the heating bodies of the system via outlet A, by-passing the secondary heat exchanger 20.

In both cases, of course, the heat output depends on the required heat output. Generally, there is also a third transient mode of operation, herein called post-circulation mode (henceforth "post_HEA") at the end of a HEA mode, with the switching of the three-way 40 to DHW mode: the burner 3 is switched off and the heat transfer fluid continues to circulate, for a short time interval known to the technicians in the field, so as to complete the disposal of heat accumulated by thermal inertia.

The post_HEA mode, for the purposes of the method of the invention, is entirely equivalent to measurements conducted in DHW mode.

The control unit of the boiler 1, henceforth abbreviated to "control unit 70", is schematically indicated by 70.

In the hydraulic scheme just described, the components of the boiler 1 which are very subject to the risk of loss of efficiency due to precipitation of impurities and formation of calcareous incrustations are those crossed by the high-temperature heat transfer fluid, specifically the pump 30, the primary exchanger 10, the secondary exchanger 20 (on its primary side, i.e. on the side connected to the inlet ducts 21 and return ducts 22 of the primary circuit 100).

The control method of the present invention is intended to monitor the state of efficiency of such components, using as a representative signal of the loss of efficiency the value of the flow rate Q of the heat transfer fluid circulating in said primary circuit 100.

Said value of the flow rate Q can be measured by known means, such as a flow switch or other type of flow sensor (not shown in the figure), present on said primary circuit 100, capable of transmitting a signal representative of said flow rate Q.

Alternatively or additionally, the value of the flow rate Q can be ascertained indirectly by means of sensors that detect and signal a group of one or more physical quantities (such as, for example, those indicated below) from which the flow rate Q itself can be calculated.

According to the preferred variant of the invention, however, the value of the flow rate Q is provided by signals emitted by a pump 30 of a so-called smart type (hereinafter referred to as "smart pump 30") without the need to provide a special flow rate sensor; in other words, the smart pump 30 has incorporated sensory means at least sufficient to deduce, by means of calculations and/or consultation of pre-stored data tables, the flow rate Q.

The smart pump 30 may also itself incorporate the processing means necessary to determine the value of said flow rate Q.

The smart pump 30 is a type of circulator capable of bi-directionally exchanging information with the control unit 70 of the boiler, which, in addition to communicating to the pump 30 the speed at which it must operate, can query it to receive specific information on its status, such as, for example:

the electrical power absorbed, the number of revolutions, the operating status (work, stand-by, error), and, precisely, the flow rate Q processed from the previous parameters.

In accordance with the preferred variant of the invention, said value of the flow rate Q is an indirectly acquired quantity, calculated as a function of the electrical power consumption and the number of revolutions by the pump smart 30, detected and transmitted by the same.

As said, it nevertheless remains understood that, for implementing the method described herein, the value of the flow rate Q can also be obtained with an ad hoc flow rate sensor, when the boiler 1 includes a pump 30 of a classical type instead of a smart pump 30.

As for the processing means necessary to determine the value of said flow rate Q, it is preferred that they reside in the control unit 70 which is specific for each type of boiler 1, without any need for any customisation of the smart pump 30. From an inventive point of view, however, the location of such processing means is completely indifferent and technically equivalent. Henceforth, the exposition of the invention will assume that all the processing capabilities reside in the control unit 70 or, more generally, by "control unit 70" we mean the whole set of data processing elements, united or distributed in several sub-sets, which are necessary to implement the method according to the invention.

The control method will now be described in detail with reference to the block diagram of FIG. 4 in a sequence of steps.

A first part of the method, referred to herein as the "method M.dhw", is intended to indicate if, during repeated readings of the Q-r value of the flow rate Q of the primary circuit 100 in DHW mode, there are decreases in the flow rate Q (in this case referred to as "flow rate Q.dhw") imparted by the pump 30 to below values considered unacceptable. These decreases indicate degradation in the efficiency of one of the components of the primary circuit 100, in particular of the primary exchanger 10 and/or of the secondary exchanger 20 (primary side) and/or of the pump 30.

The preferred variant of the first part of the method M.dhw, described herein, assumes that the manufacturer has stored in the control unit 70 at least:
- the reference value Q.dhw-rif, constant and considered optimal, that the flow rate Q impressed by the pump 30, in this case, "flow rate Q.dhw", must have when the boiler 1 is in DHW mode;
- the threshold value ΔQ.dhw-rif consisting of the decrease in the Q-r value, detected with respect to the reference value Q.dhw-rif, below which the Q-r value detected indicates an abnormal flow rate Q.dhw;
- the Fl.max value of measurements of abnormal Q-r values, considered acceptable before deciding that the detected abnormality is real and irreversible and not due to reading errors or accidental and transitory circumstances (by way of a non-limiting example, this Fl.max value is equal to 10).

The threshold value ΔQ.dhw-rif is predetermined by the manufacturer in accordance with laboratory tests and/or periodic monitoring during the actual use of the boiler 1 and/or with other elements deduced by a technician in the sector, with reference to the specific type of boiler 1 and the system.

Preferably said threshold value ΔQ.dhw-rif is chosen to accept a deviation of the flow rate value Q-r from the preferred value Q.dhw-rif between 20% and 50%, even more preferably between 20% and 25%.

This threshold value ΔQ.dhw-rif can however be modified by storing a new value ΔQ.dhw-rif in the control unit 70; this modification is appropriate, for example, if an additive is added to the heat transfer fluid that causes a variation in the values of the monitored flow rate Q.dhw.

This first part of the method M.dhw is applied with boiler 1 in DHW mode and/or post_HEA mode (if boiler 1 provides it). Pump 30 is set to maximum speed, as required in such DHW and post_HEA modes.

Since the post_HEA mode could be set to boiler 1 at any time, interrupting a HEA mode, without perceptible disturbance to the user, repeated readings of the Q-r value could be made at time intervals Δt essentially determined by the control unit 70, placing boiler 1 in post_HEA mode, if it was not already in DHW mode, when a reading of the Q-r value is desired. On the other hand, however, the eventual degradation to be detected is a slow process whose detection does not require frequent readings at narrow or obligatory intervals, therefore, unless otherwise specified below, the method should proceed with its steps every time the boiler 1 is naturally in DHW and/or post_HEA mode at indeterminate time intervals Δt. Since DHW mode and post_HEA mode are technically equivalent for the purpose of the method, the latter will be ignored in the method description, "DHW mode" being indifferently understood as "DHW mode" or "post_HEA" mode.

Control Method M.dhw

Step M.dhw_1

In this Step the monitoring of the Q-r value detected of the flow rate Q.dhw of the heat transfer fluid circulating in boiler 1 in DHW mode is performed; this Step M.dhw_1 includes the following steps:
- the control unit 70 initialises a memory location called "Flag" with the value Fl=0;
- the control unit 70 receives or calculates the Q-r value of the flow rate Q.dhw when boiler 1 is in DHW mode. This Q-r value is preferably measured after a period of time (e.g. 10 seconds) following activation of DHW mode so that it is representative of a stabilised flow rate value;
- this Q-r value is recorded in the memory of the control unit 70 as a stabilised value Q-r.0;
- we proceed to Step M.dhw_1.1.

Step M.dhw_1.1

In this Step, it is ensured that the Q-r value read is a stabilised value.

The measurement of the Q-r value acquired in Step M.dhw_1 is repeated after a preferred time interval Δt of a few seconds to allow the heat transfer fluid to expel any air bubbles obstructing circulation and the new value Q-r.1 obtained is compared with the stabilised value Q-r.0 stored after the previous reading:
- if Q-r.1>Q-r.0 results, a situation that represents the fact that air bubbles have been expelled from the primary circuit 100 after the previous measurement, obstructing the circulation of the heat transfer fluid, in the control unit 70 the value Q-r.0 is updated by setting Q-r.0=Q-r.1; i.e. the flow rate Q-r value Q.dhw is updated to Q-r.1 and we return to the beginning of this Step M.dhw_1 to check if the flow rate stabilisation process is still in progress;
- otherwise, if the new value Q-r.1 does not exceed Q-r.0 (i.e. if Q-r.1≤Q-r.0; stabilised flow rate index Q.dhw):
  - in the control unit 70, the previous stabilised value Q-r.0 is kept in memory as the Q-r value,
  - and we proceed to the next Step M.dhw_1.2 to compare this stored Q-r value of the flow rate Q.dhw with the reference value Q.dhw-rif, stored for Q.dhw.

Step M.dhw_1.2

In this step it is ascertained whether the read Q-r value shows a decrease which is an indication of transitory or persistent anomalies:
- if the deviation between the two values Q.dhw-rif and Q-r does not exceed the predefined threshold value ΔQ.dhw-rif (i.e. if Q.dhw-rif−Q-r≤ΔQ.dhw-rif), the control unit 70 interrupts the control method by terminating the monitoring of the Q-r value of the Q.dhw flow rate and goes to the final step END.dhw_2 where it ends the cycle, preparing itself to periodically repeat said control method "M.dhw" starting from Step M.dhw_1;
- if, on the contrary, this decrease of the last Q-r value of the Q.dhw flow rate is over the threshold value ΔQ.dhw-rif (Q.dhw-rif−Q-r>ΔQ.dhw-rif) this means that a Q-r value of the Q.dhw flow rate considered abnormal has been detected, and then:
  - the Fl value stored in the Flag memory location is increased by one unit,
  - the stored Fl value is compared with the predetermined Fl.max value and if Fl=Fl.max it is concluded that the detected anomaly is persistent because an uninterrupted sequence of Fl.max times with an anomalous Q-r value has been detected and we proceed to Step END.dhw_1, otherwise, we proceed to Step END.dhw_2.

Step END.dhw_2

The control unit 70 stops the cycle of the M.dhw method, but prepares to repeat it starting from Step M.dhw_1:

periodically within a predetermined and settable time period which may mean, for example, immediately or instead after several months, and/or at the command of the user or the Technical Assistance Service (hereinafter "SAT") at any time.

Step END.dhw_1

In this step, the control unit 70 is provided for issuing an alarm signal W.dhw, preferably consisting of a signal perceptible by the user, visual and/or acoustic, which said control unit 70 provides to the display of the boiler 1, and/or to connectivity services for the user, and/or to communications via e-mail to the SAT.

Once the Step END.dhw_1 has been performed, the boiler 1 continues in its normal operation and its operation is not necessarily interrupted. However, the alarm signal W.dhw is significant, for the user and/or for the SAT, of the fact that there is a degradation in the efficiency status of one of the components of the primary circuit 100. This alarm signal W.dhw, therefore, represents a useful element to proceed with control and maintenance activities of the pump 30 and/or of the primary exchanger 10 and/or of the secondary exchanger 20 (primary side) before the boiler 1 incurs in major problems and is no longer able to function adequately or in any case with satisfactory efficiency.

At the end of the control method M.dhw, if the alarm W.dhw has not been emitted, it means that no persistent anomalies have been detected in the mentioned components of the primary circuit 100 of the boiler 1 and no further check is necessary. If, on the other hand, the alarm W.dhw has been emitted, this indicates the presence of a problem in one, and almost certainly in only one, of these components: pump 30, primary heat exchanger 10, secondary heat exchanger 20 on the primary side (hardly in more than one of these, because it is unlikely that during a single execution of the M.dhw method, irreversible anomalies have emerged in several elements, all of which were regular in a previous execution of the same method).

In other words, if this control method M.dhw is periodically performed, it signals the reaching of a state of degradation of one of the components 30, 10, 20 of the primary circuit 100, before others among them have reached such state.

It is preferably the manufacturer, on the basis of his experience and possibly of the working conditions of the boiler 1, who establishes the time intervals between two consecutive executions of the method M.dhw, it being understood that its continuous execution is advisable because it does not involve any waste of energy or disturbance to the user.

It can therefore be stated that, reasonably, the method M.dhw according to the invention, if periodically repeated, indicates that only one of said three components "pump 30, primary exchanger 10, secondary exchanger 20 (primary side)" has reached a state of degradation requiring maintenance, although there is no certainty as to which, among said three components, such degradation actually occurs.

At this point, it may be useful to further refine the monitoring, by performing a subsequent step of the method according to the invention, capable of discriminating which is actually the component of the primary circuit 100 responsible for the significant drop in the flow rate Q of the heat transfer fluid. This control method (hereinafter the "method M.hea") is carried out with the boiler 1 in HEA mode as shown in FIG. 3, i.e. with the three-way switch 40 switched in such a way as to disconnect the secondary exchanger 20 from the primary circuit 100, closing the return duct 22 of said primary circuit 100; then the heat transfer fluid is sent to supply the heating bodies of the system via the supply duct 12 and the outlet A, to return to the primary exchanger 10 via the inlet E and the return duct 11.

As summarized in the block diagram in FIG. 5, the method M.hea involves measuring the value of the flow rate Q.hea of the heat transfer fluid circulating in boiler 1 in HEA mode. Note that the value of the flow rate Q.hea varies with the state of boiler 1 and the network of heating bodies.

This flow rate value Q.hea is then compared with a flow rate value Q.hea-rif, which is representative of the flow rate of the heat transfer fluid circulating in boiler 1 in HEA mode during the calibration step of the system, at the time of installation during the first start-up of boiler 1 or a subsequent set-up by a technician (hereinafter, both referred to as the "calibration step").

The above-mentioned flow rate value Q.hea-rif, therefore, is a reference value measured and stored in the control unit 70 in a step prior to the one in which this method M.hea is applied, specifically during the calibration step of the system, carried out by the installer by calibrating the whole system under standard conditions, i.e. with all the heating bodies open and the by-pass 50 closed.

It follows that in order to make a meaningful comparison between the two flow rate values Q.hea and Q.hea-rif (Step M.hea_1), this flow rate value Q.hea must be measured, during the execution of this method M.hea, under the same operating conditions of the aforementioned system calibration step, i.e.:

with all the heating bodies open (after checking, therefore, that some of them have not been closed in the meantime, by choice of the user or by automatic activation of any thermostatic valves), and with by-pass 50 closed.

The exclusion of the said by-pass 50, the activation of which would modify the flow rate value Q.hea making it not comparable in a homogeneous way with the flow rate value Q.hea-rif, can typically occur in three ways:

by automatically setting the speed of the pump 30 to a value such that this by-pass 50 does not open, typically at a speed between 60% and 85% of the maximum;

or by means of a manual closing of the same;

or by an automatic closure by means of an electromechanical actuator controlled by the control unit 70.

Considering the above mentioned operating conditions of this method M.hea, it would be preferable for it to be carried out by a specialized technician such as the installer.

However, it can also be envisaged that this step of the method M.hea can be carried out on user input, providing suitable warning procedures and instructions so that boiler 1 is previously placed in the same operating conditions of the calibration step in which the flow rate value Q.hea-rif was measured and stored. An alternative way is to calibrate the system by bypassing the heating system entirely, by connecting the outlet A to the inlet E by means of a by-pass pipe (not shown in the figures except for a preferred variant and herein called "calibration by-pass"), provided with a pressure drop substantially simulating the pressure drops of an actual heating system. Preferably, such a calibration by-pass has one or more of the following characteristics, some of them being clearly alternative:

the pressure drops are adjustable by means of a calibratable throttling valve, equipped with a knob that regulates the pressure drop;

this knob is graduated so that it is possible to safely set a pre-set pressure drop similar to that of the heating body circuits that boiler 1 is able to serve;

it consists of a gauge which the installer mounts during calibration, and then mounts again during the check which will be carried out later using this method M.hea;

it consists, as an alternative to the preceding paragraph, in an element permanently mounted in the boiler 1 and capable of being made operational by the manual or remote-controlled opening of a shut-off valve it consists (see FIG. 1) in a "by-pass simulator 55" coinciding with the by-pass circuit 50 in which, according to the invention:

the check valve 51 can be forced open manually or by remote control, the calibratable throttling valve 52 can be operated manually or by remote control to bring the by-pass circuit 50 into calibration by-pass mode, two shut-off valves 53 and 54, which can be operated manually or by remote control, exclude the circulation of the heat transfer fluid towards the heating bodies.

As far as the method M.hea is concerned, it is absolutely indifferent whether the boiler 1 is brought into the HEA mode with the actual heating circuit in the state of a previous calibration step or using the just described calibration by-pass in the different variants; it is only important that during this method M.hea, the heating system, real or simulated, has the same pressure drop at which the previous calibration step was carried out and that this pressure drop is preferably representative of normal operating conditions.

Control Method M.hea

Following the emission of the alarm signal W.dhw, which occurred with the Step END.dhw_1 of the previous method M.dhw, this method M.hea can be performed to further discriminate which is the component of the primary circuit 100 responsible for the drop in the flow rate of the heat transfer fluid.

As mentioned above, this method M.hea foresees the measurement of the value of the flow rate Q.hea of the heat transfer fluid circulating in the boiler 1 in HEA mode, with pressure losses of the system (actual or simulated through the by-pass 50, 55) which are substantially the same as the previous calibration step in HEA mode, during which the value of the flow rate Q.hea was measured equal to a reference value Q.hea-rif.

As summarised in the block diagram in FIG. 5, this method M.hea involves the following steps:

Step M.hea_1

In this Step the flow rate Q.hea is measured and:

if the measured value Q.hea is the same as the flow rate value Q.hea-rif (Q.hea=Q.hea-rif), the degraded component of the primary circuit 100 is the secondary heat exchanger 20 on the primary side and the method continues with Step END.hea_1,— otherwise (i.e. if Q.hea Q.hea-rif) the method goes to Step END.hea_2.

Step END.hea_1

In this Step:

the condition W.20 is signalled, representing the fact that the secondary exchanger 20 on the primary side is the component of the primary circuit 100 responsible for the significant drop in flow rate Q.dhw signalled by the alarm signal W.dhw in the previous Step END.dhw_1;

the routine of method M.hea is terminated.

Step END.hea_2

In this Step:

the condition W.30-10 is signalled, representing the fact that it is one of the pumps 30 or the primary exchanger 10 that has caused the significant drop in flow rate Q.dhw signalled by the alarm signal W.dhw in Step END.dhw_1 of the previous method M.dhw;

the routine of method M.hea is terminated.

Said conditions W.20 and W.30-10 may consist of visual and/or acoustic signals that the control unit 70 provides to the boiler display 1, and/or to connectivity services for the user, and/or email communications to the SAT.

In both conditions W.20 and W.30-10, therefore, the control method M.hea provides useful information to further discriminate in which components of the primary circuit 100 the degradation of the efficiency status resides:

in the case of the condition W.20 there is the certainty that the component responsible is the secondary exchanger 20 on the primary side;

in the case, however, of condition W.30-10 there is still some uncertainty between pump 30 and primary exchanger 10 and both must be examined, with the intervention of technical assistance.

However, in the variant of the invention in which said pump 30 consists of a smart pump 30, the condition W.30-10 can be integrated with further information requested by the control unit 70 from said smart pump 30, including information representative of its operating state, which makes it possible to assess whether the component of the primary circuit 100 which is the object of the decrease in the flow rate value Q.dhw is actually the smart pump 30 or the primary exchanger 10: in such an event, the control method M.hea can continue with the issuance of a signal W.10 or W.30, in the event that from this integration of information provided by the smart pump 30 the control unit 70 deduces that the degraded component is actually the primary exchanger 10 or the pump 30, respectively.

Control Method M.hea.bis

As an alternative to the above-described control method M.hea which, as said, is typically carried out by a specialized technician, an alternative method of execution can be envisaged, this time however performed automatically by the control unit 70 and always aimed at further discriminating which is the component of the primary circuit 100 responsible for the drop in the flow rate of the heat transfer fluid which has caused the emission of the alarm signal W.dhw in the Step END.dhw_1 of the previous method M.dhw.

Like the method M.hea, this second variant of the control method (hereinafter "method M.hea.bis") is carried out with the boiler 1 in HEA mode as shown in FIG. 3, that is, with the three-way 40 switched so as to disconnect the secondary exchanger 20 from the primary circuit 100, closing the return duct 22 of said primary circuit 100.

This method M.hea.bis is performed automatically by the control unit 70 and presupposes that the speed of the pump 30 is automatically set at a value such that the by-pass 50 does not open, preferably at a speed between 60% and 85% of the maximum.

Furthermore, the method M.hea.bis described herein requires that the control unit 70 contains in its memory at least:

the reference value Q.hea.bis-rif, deemed optimal, that the flow rate Q.hea imparted by the pump 30 must have when the boiler 1 is in HEA mode: this Q.hea.bis-rif value is generally equal to the value of the flow rate of the heat transfer fluid circulating during the calibration step of the system (upon installation during the first start-up of the boiler 1 or a subsequent adjustment by a technician); alternatively, if the technician has not performed this calibration step, this Q.hea.bis-rif value is initially equal to 0 and is then replaced by an updated reference value following the first flow rate reading, performed at the end of the first heat demand following the installation of boiler 1: in both cases, said Q.hea.bis-rif reference value is periodically updated and stored in the control unit 70 in the event that, with subsequent periodic readings, it turns out to be higher than the previously stored value, since it is representative of a Q.hea.bis-rif reference value that has been stabilized thanks to the expulsion of air bubbles from the heat transfer fluid;

the threshold value ΔQ.hea.bis-rif consisting of the decrease in the Q.hea.bis value, measured with respect to the Q.hea.bis-rif reference value.

This threshold value ΔQ.hea.bis-rif is predetermined by the manufacturer in accordance with laboratory tests and/or periodic monitoring during the actual use of the boiler 1 and/or with other elements deduced by a technician in the sector, with reference to the specific type of boiler 1 and to the system.

Preferably, the threshold value ΔQ.hea.bis-rif is chosen to accept a deviation of the flow rate value Q.hea.bis from the preferred value Q.hea.bis-rif not exceeding 20%.

The above-mentioned reference value Q.hea.bis-rif can also be modified by storing a new Q.hea.bis-rif value in the control unit 70, for example, if an additive is added to the heat transfer fluid that causes a change in the values of the monitored flow rate Q.hea.bis.

Similarly to what is described for the method M.hea of FIG. 5, the method M.hea.bis involves the following steps (summarised in the block diagram of FIG. 6):

Step M.hea.bis_1

In this Step the monitoring of the Q.hea.bis value detected of the flow rate Q.hea of the heat transfer fluid circulating in boiler 1 in HEA mode is carried out, following the emission of the alarm signal W.dhw issued in Step END.dhw_1 of the previous method M.dhw.

With this step M.hea.bis_1, preferably carried out at the end of the first heat demand following the mentioned emission of the alarm signal W.dhw, it is ascertained whether or not the read Q.hea.bis value shows a decrease, compared to the Q.hea.bis-rif value of the reference flow rate, that goes beyond the above mentioned predefined threshold value ΔQ.hea.bis-rif, and:

if the deviation between the two values Q.hea.bis-rif and Q.hea.bis does not exceed this predefined threshold value ΔQ.hea.bis-rif (i.e. if Q.hea.bis-rif–Q.hea.bis<=ΔQ.hea.bis-rif), the degraded component of the primary circuit 100 is the secondary side heat exchanger 20 and the method continues with the Step END.hea-bis_1, otherwise (i.e. if Q.hea.bis-rif–Q.hea.bis>ΔQ.hea.bis-rif), the method goes to Step END.hea-bis_2.

Step END.hea.bis_1

In this Step:

the control unit 70 signals the condition W.20, representing that the secondary exchanger 20 on the primary side is the component of the primary circuit 100 responsible for the significant drop in the flow rate Q.dhw signalled by the alarm signal W.dhw in the previous Step END.dhw_1;

the routine of the method M.hea.bis is terminated.

Step END.hea.bis_2

In this Step:

the control unit 70 signals the condition W.30-10, representing that it is one of the pumps 30 or the primary exchanger 10 that has caused the significant drop in flow rate Q.dhw signalled by the alarm signal W.dhw in Step END.dhw_1 of the previous method M.dhw;

the routine of the method M.hea.bis is terminated.

Similarly to what has been seen for the control method M.hea, also in this variant of the method M.hea.bis the conditions signalled in the steps END.hea.bis_1 and END.hea.bis_2 may consist of visual and/or acoustic signals that the control unit 70 provides to the display of the boiler 1, and/or to connectivity services for the user, and/or to communications via e-mail to the SAT.

And similarly to the control method M.hea, also in this case, when a smart pump 30 is present, the signalled condition W.30-10 can be integrated with further information requested by the control unit 70 to said smart pump 30, among which the information representative of its operating status, which allows assessing whether the component of the primary circuit 100 subject to the decrease in the flow rate value Q.dhw is actually the smart pump 30 or the primary exchanger 10: in such a case, the control method M.hea.bis may continue with the emission of a signal W.10 or W.30, in the event that from such integration of information provided by the smart pump 30 the control unit 70 deduces that the degraded component is actually the primary exchanger 10 or the pump 30, respectively.

It is clear that numerous variants of the control method and of the relative boiler 1 using said method are possible to the person skilled in the art, without however going beyond the scope of innovation inherent in the inventive idea, just as it is clear that in the practical implementation of the invention the various components described above may be replaced by technically equivalent elements.

For example, the same method of control can also be used in a boiler 1 without by-pass 50, in this case, being able, even in the method M.hea or M.hea.bis, to have the pump 30 not modulating or, even if modulating, running at maximum speed.

The invention claimed is:

1. Method for controlling a gas boiler, said boiler comprising:
    a primary circuit for the heating of heat transfer fluid, in turn comprising:
        a combustion chamber housing a primary exchanger and a burner fed by an air/gas mix provided by a fan and by a gas valve,
        feeding and return conduits of the heat transfer fluid flowing in said primary circuit, respectively adapted to lead said fluid to the heating bodies of the heating system and vice versa by a circulating pump,
        inlet and return conduits for deviating said heat transfer fluid towards a secondary exchanger in its primary side,
    a secondary circuit for the heating of sanitary water, comprising:
        said secondary exchanger,
        feeding and return conduits, respectively adapted to lead said cold water in an inlet of the secondary side of the secondary heat exchanger and said hot sanitary water from said secondary side of the secondary heat exchanger towards the user,
a three-way baffle valve adapted to switch the path of said heat transfer fluid:
   towards said heating bodies of the heating system via an output, in such case said boiler being in HEA operating mode to heat said fluid,
   or towards said secondary circuit, in such case said boiler being in DHW operating mode to heat said sanitary water,
a control unit adapted to manage the steps of said method and to exchange information with sensor means adapted to measure the flow rate Q of said heat transfer fluid flowing in said primary circuit,
said control method monitoring the efficiency state of said primary exchanger, and/or said primary-side secondary exchanger, and/or said pump through a periodic control of the flow rate values Q, Q-r, Q.dhw, and/or Q.hea of the heat transfer fluid flowing in said primary circuit, said flow rate values Q, Q-r, Q.dhw, and/or Q.hea being provided by said sensor means and processed by said control unit,
wherein said control method provides for the output of signals W.dhw, W.20, W.30-10, W.10, and/or W.30 representative of the loss of efficiency of said primary exchanger and/or primary-side secondary exchanger and/or pump when said flow rate values Q, Q-r, Q.dhw, and/or Q.hea reduces below the reference flow rate values Q.dhw-rif and/or Q.hea-rif, pre-stored in said control unit,
said flow rate values Q, Q-r, Q.dhw, and/or Q.hea being provided by:
   a flow meter or other equivalent type of flow rate sensor, located on said primary circuit,
   and/or a smart pump,
   and/or sensor means detecting one or more physical quantities from which said flow rate values Q, Q-r, Q.dhw, and/or Q.hea are calculated,
said control method comprising a first part "method M.dhw" wherein:
   the boiler is operated in a DHW operating mode;
   the pump is operated at the maximum rotation speed;
   the control unit contains in memory at least:
      a reference flow rate value Q.dhw-rif, representative of the optimal flow rate of the boiler in said DHW operating mode,
      a threshold value ΔQ.dhw-rif consisting in the reduction of the flow rate value Q, Q-r, and/or Q.dhw detected with respect to said reference flow rate value Q.dhw-rif, said threshold value ΔQ.dhw-rif being representative of an anomalous reduction of the flow rate value Q, Q-r, and/or Q.dhw,
      a value Fl.max representative of the maximum number of consecutive exceedances of said threshold value ΔQ.dhw-rif;
   said reference flow rate value Q.dhw-rif is compared with repeated readings of said flow rate value Q, Q-r, and/or Q.dhw flowing in the primary circuit with the boiler in said DHW operating mode, and if:
      said threshold value ΔQ.dhw-rif is exceeded for a number of consecutive times equal to said value Fl.max, then said control unit provides for a final step END.dhw_1 for the output of an alarm signal W.dhw, representative of the loss of efficiency of said primary exchanger and/or primary-side secondary exchanger and/or pump, otherwise said control unit provides for a final step (END.dhw_2), stopping said first part "method M.dhw" and setting up to repeat it periodically.

2. Method according to claim 1, wherein said threshold value ΔQ.dhw-rif is pre-set by the constructor of said boiler in accordance with laboratory tests and/or periodic monitoring during the actual use.

3. Method according to claim 2, wherein said threshold value ΔQ.dhw-rif is subsequently modified by storing in said control unit a new threshold value ΔQ.dhw-rif.

4. Method according to claim 2, wherein said threshold value ΔQ.dhw-rif is comprised between the 20% and the 50% of the value of said reference flow rate Q.dhw-rif.

5. Method according to claim 1, wherein said value Fl.max, representative of the maximum number of consecutive exceedances of said threshold value ΔQ.dhw-rif, is equal to 10.

6. Method according to claim 1, wherein said first part "method M.dhw" comprises a step M.dhw_1 wherein:
   the control unit initializes a Flag memory location with the value Fl=0;
   said control unit receives or calculates the value Q-r of the flow rate Q.dhw; such value Q-r of the flow rate Q.dhw is recorded in the memory of said control unit as a stabilised value Q-r.0.

7. Method according to claim 6, wherein said value Q-r of the flow rate Q.dhw is received or calculated by said control unit after a time frame from the start of the boiler in DHW operating mode.

8. Method according to claim 6, wherein said first part "method M.dhw" comprises a step M.dhw_1.1, subsequent to said step M.dhw_1, wherein:
   the measurement of said value Q-r of the flow rate Q.dhw is repeated after a time frame Δt, obtaining a new value Q-r.1;
   such new value Q-r.1 is compared with said stabilised value Q-r.0, and:
      if such new value Q-r.1 is greater than said stabilised value Q-r.0:
         the control unit stores this new value Q-r.1, assuming it as a new stabilised value Q-r.0, representative of the value Q-r of the flow rate Q.dhw,
         said control unit repeats said step M.dhw_1.1;
      otherwise, in said control unit, said stabilised value Q-r.0 is maintained in memory as representative of the value Q-r of the flow rate Q.dhw.

9. Method according to claim 8, wherein said first part "method M.dhw" comprises a step M.dhw_1.2, subsequent to said step M.dhw_1.1, wherein:
   said value Q-r of the flow rate Q.dhw is compared with the reference flow rate value Q.dhw-rif), and if:
      the difference between said values Q.dhw-rif, Q-r does not exceed the threshold value ΔQ.dhw-rif, the control unit stops said first part "method M.dhw" by providing for said final step END.dhw_2;
      the difference between said values Q.dhw-rif, Q-r exceeds said threshold value ΔQ.dhw-rif, said control unit:
         increases the value Fl stored in the Flag memory location by one unit, compares said value Fl stored with the value Fl.max, and if:
            Fl=Fl.max, then it provides for said final step END.dhw_1, ascertaining a persistent anomaly and outputting an alarm signal W.dhw, otherwise it stops said first part "method M.dhw" providing for said final step END.dhw_2.

10. Method according to claim 9, wherein said final step END.dhw_2 said control unit sets up to periodically repeat said first part "method M.dhw" starting from the Step M.dhw_1, periodically within a predetermined time and settable and/or on user's or SAT's command.

11. Method according to claim 9, wherein in said final step END.dhw_1 said control unit provides for the output of said alarm signal W.dhw, consisting in a visual and/or acoustic signalling, perceivable by a user, provided to the display of the boiler, and/or connectivity services for the user and/or communications via mail to an SAT.

12. Method according to claim 1, wherein said first part "method M.dhw" is carried out even with the boiler in post_HEA operating mode, wherein the burner is turned off just at the end of a HEA operating mode.

13. Method according to claim 11, comprising a second part "method M.hea", subsequent to said final step END.dhw_1 of said first part "method M.dhw", wherein:
the boiler is in HEA operating mode;
the pump is set to a variable speed as needed;
the control unit contains in memory at least one reference flow rate value Q.hea-rif, representative of the optimal flow rate of the boiler in HEA operating mode during a calibration step of the heating system;
said reference flow rate value Q.hea-rif is compared with the flow rate value Q.hea flowing in the primary circuit with the boiler in said HEA operating mode and with the heating system in the same operating conditions wherein said reference value Q.hea-rif has been stored in said control unit, and if:
said flow rate value Q.hea is equal to said reference flow rate value Q.hea-rif, then said control unit provides for a final step END.hea_1, ascertaining that the degraded component of said primary circuit is the primary-side secondary exchanger,
said flow rate value Q.hea is different from said reference flow rate value Q.hea-rif, then said control unit provides for a final step END.hea_2, ascertaining that the degraded component of said primary circuit is the primary exchanger or the pump.

14. Method according to claim 13, wherein in said calibration step wherein said reference flow rate value Q.hea-rif is measured and stored in said control unit, takes place:
upon the installation during the first switching on of the boiler, or
during a subsequent tuning of the heating system by a technician, with all the heating bodies open and with the bypass circuit closed.

15. Method according to claim 13, wherein in said calibration step wherein said reference flow rate value Q.hea-rif is measured and stored in said control unit, takes place by a bypass tube that bypasses the heating system, said bypass tube being connected directly from the outlet of the delivery conduit to the inlet of the return conduit of the primary circuit and adapted to simulate the load losses typical of a heating system.

16. Method according to claim 14, wherein said bypass circuit is closed: by automatically setting the speed of the pump to a value such that said bypass circuit does not open, or
by means of an automatic closing with the electromechanical actuator controlled by the control unit.

17. Method according to claim 13, wherein in said final step END.hea_1:
the condition W.20 is signalled, representative of the fact that it is the primary-side secondary exchanger the component of the primary circuit responsible for the decrease in the flow rate Q.dhw signalled with the alarm signal W.dhw of the previous final step END.dhw_1 of said first part "method M.dhw", ends said second part "method M.hea".

18. Method according to claim 13, wherein in said final step END.hea_2:
the condition W.10-30 is signalled, representative of the fact that it is one between the primary exchanger and the pump the component of the primary circuit responsible for the decrease in the flow rate Q.dhw signalled with the alarm signal W.dhw of the previous final step END.dhw_1 of said first part "method M.dhw", ends said second part "method M.hea".

19. Method according to claim 17, wherein said conditions W.20, W.10-30 comprise visual and/or acoustic signalling perceivable by the user, provided to the display of the boiler, and/or connectivity services for a user and/or communications to a SAT.

20. Method according to claim 18, wherein said condition W.10-30 is integrated with further information requested by the control unit to the pump when this is of the smart type, and said information integration being adapted to discriminate which one between said pump and said primary exchanger is the component of the primary circuit responsible for the decrease in the flow rate Q.dhw signalled with the alarm signal W.dhw of the previous final step END.dhw_1 of said first part "method M.dhw".

21. Method according to claim 20, wherein said control unit: signals the condition W.10, representative of the fact that it is the primary exchanger the component of the primary circuit responsible for the decrease in the flow rate Q.dhw signalled with the alarm signal W.dhw of the previous final step END.dhw_1 of said first part "method M.dhw",
or signals the condition W.30, representative of the fact that it is the pump the component of the primary circuit responsible for the decrease in the flow rate Q.dhw signalled with the alarm signal W.dhw of the previous final step (END.dhw_1) of said first part "method M.dhw".

22. Method according to claim 11, comprising a second part "method M.hea.bis", subsequent to said final step END.dhw_1 of said first part "method M.dhw", wherein:
the boiler is in HEA operating mode;
the pump is set to a speed value such that the bypass circuit does not open;
the control unit contains in memory at least:
a reference flow rate value Q.hea.bis-rif, representative of the optimal flow rate of the boiler in said HEA operating mode;
a threshold value ΔQ.hea.bis-rif consisting in the decrease in the flow rate value Q.hea.bis; Q-s detected with respect to said reference flow rate value Q.hea.bis-rif,
said reference flow rate value Q.hea.bis-rif is compared with said value Q.hea.bis of the flow rate Q.hea flowing in the primary circuit with the boiler in said HEA operating mode, and if:
the difference between said values Q.hea.bis-rif, Q.hea.bis does not exceed the threshold value ΔQ.hea.bis-rif, the control unit provides for a final step END.hea.bis_1, ascertaining that the degraded component of said primary circuit is the primary-side secondary exchanger; the difference between said values Q.hea.bis-rif, Q.hea.bis exceeds said threshold value ΔQ.hea.bis-rif, the control unit provides for a final step END.hea.bis_2, ascertaining that the degraded component of said primary circuit is the primary exchanger or the pump.

23. Method according to claim 22, wherein said reference flow rate value Q.hea.bis-rif is equal to:
the value of the flow rate flowing in the primary circuit in the calibration step of the heating system, upon the installation during the first switching on of the boiler or during a subsequent tuning of the system by a technician,
or 0, when said calibration step has not been carried out, said value equal to 0 being replaced by an updated value following the first reading of the flow rate value, carried out at the end of the first heat request subsequent to the installation of such boiler,
said reference flow rate value Q.hea.bis-rif being periodically updated and stored in the control unit if, with subsequent periodic readings, it is greater than the previous stored value.

24. Method according to claim 22, wherein said threshold value ΔQ.hea.bis-rif is pre-set by the constructor of said boiler in accordance with laboratory tests and/or periodic monitoring during the actual use.

25. Method according to claim 24, wherein said threshold value ΔQ.hea.bis-rif is not higher than the 20% of the value of said reference flow rate Q.hea.bis-rif.

26. Method according to claim 22, wherein in said final step END.hea.bis_1, said control unit: signals the condition W.20, representative of the fact that it is the primary-side secondary exchanger the component of the primary circuit responsible for the decrease in the flow rate Q.dhw signalled with the alarm signal W.dhw of the previous final step END.dhw_1 of the first part "method M.dhw", ends said second part "method M.hea.bis".

27. Method according to claim 22, wherein in said final step END.hea.bis_2, said control unit:
signals the condition W.10-30, representative of the fact that it is one between the primary exchanger and the pump the component of the primary circuit responsible for the decrease in the flow rate Q.dhw signalled with the alarm signal W.dhw of the previous final step END.dhw_1 of said first part "method M.dhw"; and
ends said second part "method M.hea.bis".

28. Method according to claim 27, wherein:
said condition W.10-30 may be is integrated with further information requested by the control unit to the pump when this is of the smart type, said information integration being adapted to discriminate which one between said pump and said primary exchanger is the component of the primary circuit responsible for the decrease in the flow rate Q.dhw signalled with the alarm signal W.dhw of the previous final step END.dhw_1 of the first part "method M.dhw".

29. Method according to claim 28, wherein said control unit: signals the condition W.10, representative of the fact that it is the primary exchanger the component of the primary circuit responsible for the decrease in the flow rate Q.dhw signalled with the alarm signal W.dhw of the previous final step END.dhw_1 of said first part "method M.dhw"; or signals the condition W.30, representative of the fact that it is the pump the component of the primary circuit responsible for the decrease in the flow rate Q.dhw signalled with the alarm signal W.dhw of the previous final step END.dhw_1 of said first part "method M.dhw".

30. Gas boiler, in particular a gas condensing boiler, comprising:
a primary circuit for the heating of the heat transfer fluid, in turn comprising:
a combustion chamber housing a primary exchanger and a burner fed by an air/gas mix provided by a fan and by a gas valve,
feeding and return conduits of the heat transfer fluid flowing in said primary circuit, respectively adapted to lead said fluid to the heating bodies of the heating system and vice versa by a circulating pump,
inlet and return conduits for deviating said heat transfer fluid towards a secondary exchanger in its primary side,
a secondary circuit for the heating of sanitary water, comprising:
said secondary exchanger,
feeding and return conduits, respectively adapted to lead said cold water in an inlet of the secondary side of the secondary heat exchanger and said hot sanitary water from said secondary side of the secondary heat exchanger towards the user,
a three-way baffle valve adapted to switch the path of said heat transfer fluid:
towards said heating bodies of the heating system via an output, in such case said boiler being in HEA operating mode to heat said fluid,
or towards said secondary circuit, in such case said boiler being in DHW operating mode to heat said sanitary water,
a control unit,
sensor means adapted to measure the flow rate Q of said heat transfer fluid flowing in said primary circuit, wherein said control unit is adapted to exchange information with said sensor means and to process it, said control unit being configured to carry out the steps of the method according to claim 1.

31. Boiler according to claim 30, wherein said control unit is adapted to exchange information with said sensor means and to process it, said control unit being configured to carry out the steps below of a second part "method M.hea", subsequent to said final step END.dhw_1 of said first part "method M.dhw", wherein:
the boiler is in HEA operating mode;
the pump is set to a variable speed as needed;
the control unit contains in memory at least one reference flow rate value Q.hea-rif, representative of the optimal flow rate of the boiler in HEA operating mode during the calibration step of the heating system;
said reference flow rate value Q.hea-rif is compared with the flow rate value Q.hea flowing in the primary circuit with the boiler in said HEA operating mode and with the heating system in the same operating conditions wherein said reference value Q.hea-rif has been stored in said control unit, and if:
said flow rate value Q.hea is equal to said reference flow rate value Q.hea-rif, then said control unit provides for a final step END.hea_1, ascertaining that the degraded component of said primary circuit is the primary-side secondary exchanger,
said flow rate value Q.hea is different from said reference flow rate value Q.hea-rif, then said control unit provides for a final step END.hea_2, ascertaining that the degraded component of said primary circuit is the primary exchanger or the pump.

32. Boiler according to claim 30, wherein said sensor means comprise: a flow meter or other equivalent type of flow rate sensor, located on said primary circuit, and/or a smart pump, and/or sensor means detecting one or more physical quantities from which said flow rate Q of said heat transfer fluid flowing in said primary circuit is calculated.

33. Boiler according to claim 30, comprising a bypass circuit adapted to reintegrate the flow rate Q of said heat transfer fluid, when said flowrate drops below a threshold level.

34. Boiler according to claim 33, comprising a calibrating bypass, adapted to simulate the load loss typical of a heating system, said calibrating bypass comprising said bypass circuit adapted to reintegrate the flow rate Q of said heat transfer fluid and special check, throttling, shut-off valves.

* * * * *